United States Patent
Horn et al.

(10) Patent No.: US 6,379,051 B1
(45) Date of Patent: Apr. 30, 2002

(54) RING FOR A ROLLER

(75) Inventors: Werner Horn, Schweinfurt; Hans-Jürgen Liesegang, Schortens; Klemens Schmidt, Würzburg, all of (DE)

(73) Assignee: SKF GmbH, Schweinfurt (DE)

( * ) Notice: Subject to any disclaimer, the term of this patent is extended or adjusted under 35 U.S.C. 154(b) by 38 days.

(21) Appl. No.: 09/660,183

(22) Filed: Sep. 12, 2000

(30) Foreign Application Priority Data

Sep. 13, 1999 (DE) .......................... 199 43 656

(51) Int. Cl.$^7$ ................................ F16C 33/64
(52) U.S. Cl. ................... 384/569; 384/537; 384/584
(58) Field of Search ................... 384/569, 537, 384/571, 584, 585

(56) References Cited

U.S. PATENT DOCUMENTS 6,086,262 A * 7/2000 Matsumoto .............. 384/450
6,234,679 B1 * 5/2001 Sjostrom .................. 384/492

* cited by examiner

*Primary Examiner*—Lenard A. Footland
(74) *Attorney, Agent, or Firm*—Burns, Doane, Swecker & Mathis, L.L.P.

(57) ABSTRACT

An annular ring used as either the outer race or the bearing race in a roller includes at least one annular recess in which is disposed an annular reinforcement body. The reinforcement body subjects the region of the annular ring radially inside the reinforcement body to mechanical stresses. The side of the reinforcement body oriented toward this region is materially joined or bonded to the ring. The annular reinforcement body preferably possesses an internal radius that is smaller than the internal radius of the recess and the reinforcement body press-fitted into the recess. According to one embodiment, the reinforcement body is poured in liquid form into the recess. The shrinkage of the reinforcement body that occurs during the cooling phase after solidification produces stresses as well. The manner in which the reinforcement body is introduced into the recess of the ring is preferably selected so that the radially inwardly oriented surface of the reinforcement body is joined materially to the outer ring so that the stresses generated in the reinforcement body, for instance as a consequence of the press fit, are transmitted to the outer ring. The material joining can be done by forging, welding, and friction welding, and possibly also by adhesive bonding if the stresses are not overly high.

17 Claims, 1 Drawing Sheet

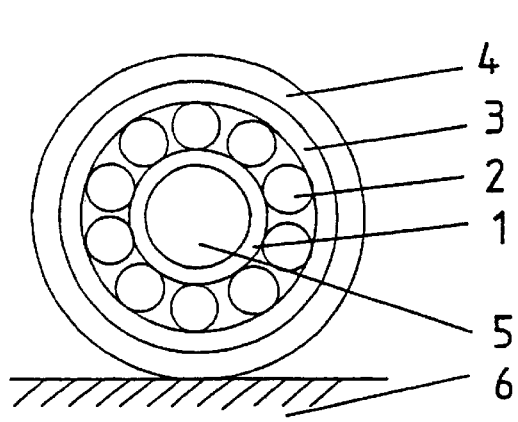
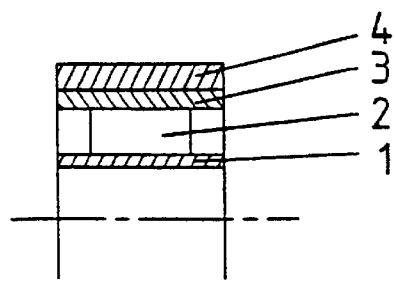
Fig. 1    Fig. 2
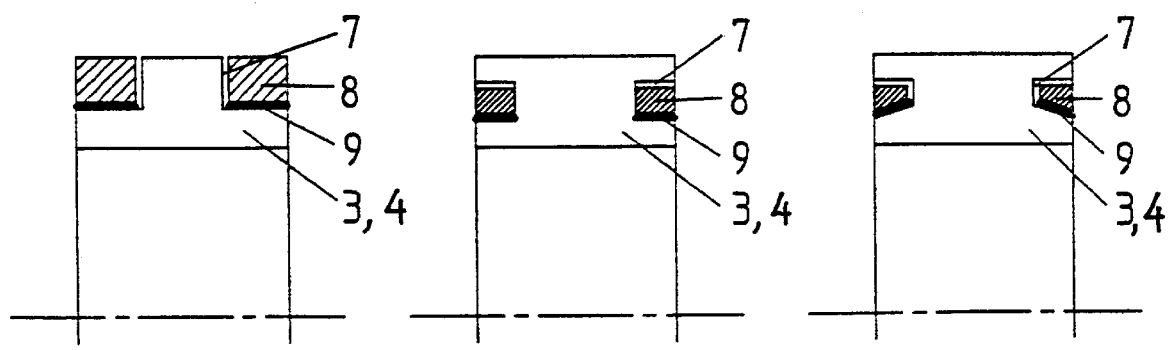
Fig. 3    Fig. 4    Fig. 5

RING FOR A ROLLER

This application is based on and claims priority under 35 U.S.C. §119 with respect to German Application No. P 199 43 656.8 filed on Sep. 13, 1999, the entire content of which is incorporated herein by reference.

FIELD OF THE INVENTION

This invention generally relates to rollers. More particularly, the present invention pertains to a ring which can be used as an outer race or as a bearing race in a roller, and to a method for producing the ring.

Rollers typically include a roller bearing having an inner race, an outer race, roller bodies and a bearing race concentrically surrounding the outer race. The bearing race can be omitted, with the outer race performing the function of the bearing race. One context in which rollers are used is in forklifts in which the fork rolls along rollers positioned on the lifting mast. In this application and a number of others, the rollers are exposed to heavy loads. Thus, high bending stresses occur at the outer race and the bearing race, especially when the main load is introduced into the region between successive or adjacently arranged roller bodies. Both the outer race and the bearing race must be designed to absorb the incident bending stresses without being damaged. As a general rule, this typically means fabricating the outer race and the bearing race so that they possess relatively significant material thicknesses. This of course undesirably increases the cost and weight associated with the resulting products.

In light of the foregoing, a need exists for a roller, particularly an outer race or bearing race for a roller, that is capable of absorbing incident bending stresses during operation without significantly increasing the weight.

SUMMARY OF THE INVENTION

Generally speaking, the present invention provides an outer ring of a roller with the outer ring being adapted to form either the outer race or the bearing race of the roller. The outer ring is advantageously constructed to produce internal mechanical stresses that counteract the bending stresses occurring during operation of the roller so that the outer ring and the roller can be designed for a reduced load in an economical and light weight manner. The stresses are created by virtue of at least one annular reinforcement body that is press-fitted into a recess in the outer ring of the roller, and whose internal radius is smaller than the internal radius of the recess. The manner in which the reinforcement body is introduced into the recess of the outer ring is preferably selected so that the radially inwardly oriented surface of the reinforcement body is joined materially to the outer ring so that the stresses generated in the reinforcement body, for instance as a consequence of the press fit, are transmitted to the outer ring. The material joining can be done by forging, welding, and friction welding. If the stresses are not excessively high, adhesive bonding can also be employed. Also, the reinforcement body can be poured into the recess in liquid form and during shrinkage of the reinforcement body that ensues in the cooling phase after solidification, stresses occur in the outer ring in this version as well.

One aspect of the present invention involves a roller that includes an annular inner race, an annular outer ring, and a plurality of roller bodies positioned radially inwardly of the annular outer ring and radially outwardly of the annular inner race for rolling along a radially outwardly facing surface inner race. The outer ring is provided with at least one annular recess in which is disposed an annular reinforcement body which subjects the region of the outer ring located radially inside the reinforcement body to mechanical stresses. A side of the reinforcement body facing toward the region that is subjected to such stresses is materially joined to the outer ring.

According to another aspect of the invention, an outer ring is provided for a roller that also includes an inner race and a plurality of roller bodies disposed radially outwardly of the inner race for rolling on the outer peripheral surface of the inner race. The outer ring is comprised of an annular ring provided with at least one annular recess in which is disposed an annular reinforcement body that subjects the region of the annular ring located radially inwardly of the reinforcement body to mechanical stresses. The side of the reinforcement body facing towards the region of the annular ring that is subjected to such mechanical stresses is materially joined to the annular ring.

Another aspect of the present invention involves a method for producing an outer ring for a roller that also includes an inner race and a plurality of roller bodies disposed radially outwardly of the inner race for rolling on the outer peripheral surface of the inner race. The method involves machining at least one annular recess into an annular ring, positioning in the recess a reinforcement body that subjects the region of the annular ring radially inside the reinforcement body to mechanical stresses during operation of the roller, and materially joining the side of the reinforcement body facing the region subjected to such stresses to the annular ring.

BRIEF DESCRIPTION OF THE DRAWING FIGURES

The foregoing and additional features and characteristics associated with the present invention will become more apparent from the following detailed description considered with reference to the accompanying drawing figures in which like elements are designated by like reference numerals and wherein:

FIG. 1 is a side view of a roller;

FIG. 2 is a cross-sectional view of a portion of the roller shown in FIG. 1;

FIG. 3 is a cross-sectional view of a first embodiment of the outer race or bearing race according to the present invention;

FIG. 4 is a cross-sectional view of a second embodiment of the outer race or bearing race according to the present invention; and FIG. 5 is a cross-sectional view of a third embodiment of the outer race or bearing race according to the present invention.

DETAILED DESCRIPTION OF THE INVENTION

FIG. 1 illustrates the basic structure of a roller, which is known per se, and shown the roller in a typical installation environment. As shown in FIG. 1, the roller includes an inner race or ring 1, a plurality of roller bodies 2, an outer race or ring 3, and a bearing race or ring 4. The inner race 1 forms the radially innermost of the listed features while the bearing race 4 forms the radially outermost of the listed features. In the illustrated embodiment, the plurality of roller bodies 2 are located between the inner race 1 and the outer race 3, while the bearing race 4 is located radially outwardly of the outer race 3 and concentrically surrounds the outer race 3. The roller bodies 2 roll along the radially outwardly facing outer surface of the inner race 1 and the radially inwardly facing surface of the outer race 3. The roller bodies 2 are, as a general rule, embodied as rolls, such as cylinder rolls or conical rolls. However, other roller bodies such as spherical roller bodies 2 can also be used.

The inner race 1 is braced or supported on a shaft 5 while the bearing race 4 rolls on a surface 6. During this rolling operation, the load introduced into the roller via the line of contact between the bearing race 4 and the surface 6 acts in an alternating manner on regions of the outer race 3 that are supported by one of the roller bodies 2 and on regions of the outer race 3 that are located between successive or adjacent roller bodies 2. When the load introduced into the roller via the line of contact between the bearing race 4 and the surface 6 acts on regions of the outer race 3 that are located between successive or adjacent roller bodies 2, there is no roller body to provide support in the direction of the force introduction. The lack of support of the loaded regions means that bending stresses develop both in the outer race 3 and in the bearing race 4. These bending stresses should be taken into account in the choice of material and the dimensioning of the outer race 3 and bearing race 4 to avoid overload and damage to the outer race 3 or bearing race 4 during operation.

The following discussion of the present invention is set forth from the standpoint of describing the outer race 3. However, it is to be understood that the below described construction is equally applicable to the bearing race 4 as well.

Referring to FIG. 3, the outer race 3 is provided with two annular recesses 7. Each of these annular races 7 is disposed in the region of one of the annularly encompassing radially outer edges of the outer race 3 that is located between the radially outwardly facing outer peripheral surface of the outer race 3 and the axially facing end surface of the outer race 3. Each recess 7 is thus open to the radially outwardly facing outer peripheral surface of the outer race 3 as well as towards one of the axially facing end surface of the outer race 3. Also, a portion of the outer race 3 is disposed on the radially inwardly located side of each recess 7.

An annular reinforcement body 8 is press-fitted into each of the recesses 7. The annular reinforcement body 8 possesses an inside diameter less than the outer diameter of the seat face of the recess 7 onto which the reinforcement body 8 is press-fitted. That is, the reinforcement body 8 is disposed in a press fit manner in the recess 7 of the outer race 3. By virtue of this press fit, mechanical stresses are generated in the outer race 3.

During operation of the roller, these mechanical stresses counteract the stresses that occur in the outer race 3 from the introduction of external loads and so the actual effective load is reduced. To allow this compensatory effect to occur, a material bond 9 should exist between the inner surface of the reinforcement body 8 and the corresponding seat face of the outer race 3 as the non-positive engagement produced by the press-fit is typically not sufficient, by itself, to achieve this compensatory effect.

The material bond can be established by welding, in particular friction welding. With friction welding, the outer race 3 and the reinforcement body 8 are rotated relative to one another when the reinforcement body 8 is press-fitted into the recess 7 of the outer race 3. Because of the lining up of the areas of contact which move and exert pressure on one another, between the outer race 3 and the reinforcement body 8, heat from the frictional contact occurs and this welds the areas of contact together. As an alternative to welding, other techniques can be employed for materially bonding the reinforcement body 8 to the outer race 3. These alternative techniques include forging and possibly also adhesive bonding if the stresses are not excessively high. Also, the material bonding that is selected should be capable of providing the requisite strength for a given application.

It is also possible to pour the reinforcement bodies 8 into the respective recesses 7 in a somewhat liquid form, for instance in the form of a melt. By virtue of the material being poured in, the wall faces of the recess 7 of the outer race 3 begin to melt so that during the course of the subsequent cooling process a material bond is created between the reinforcement body 8 and the outer race 3. Using a parting agent, such as ceramic powder, it is possible to control which contact faces experience a material bond, and which do not. As cooling proceeds after solidification, the reinforcement body 8 shrinks and is thus pressed radially inward against the corresponding seat face of the recess in the outer race 3 so that in this version a kind of press fit is created.

FIG. 4 illustrates in cross-section a second embodiment of the outer race 3 in accordance with the present invention. In this embodiment, the two recesses 7 are disposed in the region between the inner peripheral face and the outer peripheral face of the outer race 3. Thus, a part of the outer race 3 is located radially inwardly of the recess 7 and radially outwardly of the recess 7. Each of the recesses 7 opens toward one of the axially facing end faces of the outer race 3 so that the respective reinforcement bodies 8 can be introduced. FIG. 4 shows the outer race 3 after the reinforcement bodies 8 have been introduced into the respective recesses 7.

FIG. 5 illustrates in cross-section a third embodiment of the outer race 3 in accordance with the present invention. In this embodiment, in the regions where the reinforcement bodies 8 are press-fitted together with the outer race 3, the recesses 7 are conically shaped or angled towards the center of the outer race 3. The corresponding counterpart faces of the reinforcement bodies 8 likewise possess a conical or angled shape. This makes it easier to press fit the reinforcement bodies 8 into the recesses. In all other respects, the third embodiment is like the second embodiment.

In the various embodiments described above, it is preferable that the recess 7 be disposed in the region of the outer race 3 in which zero crossover of bending stress occurs in the outer ring during operation of the roller. The region in which zero crossover of bending stress occurs during operation is the region where the bending stress changes sign between the inner radius and outer radius of the outer race 3. This can be analogized to the bending of a cantilevered beam that is fixed at one end and subjected to a vertical downward load at the opposite end. The applied load elongates the upper side of the beam and compresses the lower side of the beam, thus producing a corresponding bending stress along the beam. At a point between the upper side and lower side, no bending stress is present and this represents the region of zero crossover of the bending stress, in other words the region where the bending stress changes sign. Similarly, in the case of the present invention, the outer race 3 is acted upon by a force via the roller bodies 2. The outer race 3 is fixed in the downward vertical direction at the position where the bearing race 4 contacts the ground 6. The outer race 3 is thus slightly bent and so a bending stress exists in the outer race 3. This bending stress changes sign or inflection at a point between the inner radius or periphery and the outer radius or periphery of the outer bearing race. This region where the bending stress changes sign or inflection is the region of zero crossover of bending stress. By positioning the recesses 7 in this region of very low bending stress, it is possible to avoid negative effects associated with weakening of the outer bearing race material by virtue of the annular recesses 7.

In the above-described embodiments, the reinforcement bodies are described as being fitted to the outer race 3. However, as mentioned earlier, the invention can also be applied to other parts of the roller. For example, in addition to the outer race 3 or instead of the outer race 3, the bearing race 4 can also be provided with at least one reinforcement body 8 fitted into a recess disposed in a manner similar to that shown in FIGS. 3–5. Thus, the descriptions set forth above with regard to the outer race 3 apply equally to the bearing race 4 as well.

By virtue of the present invention, the outer race or bearing race of the roller, and thus the roller itself, is capable of absorbing incident bending stresses during operation without significantly increasing the weight of the outer race, the bearing race or the roller.

The principles, preferred embodiments and mode of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A roller comprising: an annular inner race, an annular outer ring, and a plurality of roller bodies positioned radially inwardly of the annular outer ring and radially outwardly of the annular inner race for rolling along a radially outwardly facing surface inner race, the outer ring being provided with at least one annular recess in which is disposed an annular reinforcement body which subjects a region of the outer ring located radially inside the reinforcement body to mechanical stresses, a side of the reinforcement body facing toward said region being materially joined to the outer ring.

2. The roller according to claim 1, wherein said outer ring possesses oppositely located and axially facing end faces, said recess opening towards one of the end faces of the outer ring.

3. The roller according to claim 2, wherein the recess has a conical cross-section.

4. The roller according to claim 1, wherein said outer ring possesses a radially outwardly facing outer peripheral surface, said recess opening towards the outer peripheral surface of the outer ring.

5. The roller according to claim 1, wherein the recess has a conical cross-section.

6. The roller according to claim 1, wherein said outer ring possesses oppositely located and axially facing end faces and possesses a radially outwardly facing outer peripheral surface, said recess opening to one of the end faces of the outer ring and to the outer peripheral surface of the outer ring.

7. The roller according to claim 1, wherein the outer ring is provided with two annular recesses in each of which is disposed a respective annular reinforcement body which subjects a region of the outer ring located radially inside the respective reinforcement body to mechanical stresses, a side of each respective reinforcement body facing toward said region being materially joined to the outer ring.

8. The roller according to claim 1, wherein the outer ring is an outer race, and including a bearing race concentrically surrounding the outer race.

9. The roller according to claim 1, wherein the outer ring is a bearing race, and including an outer race concentrically surrounded by the bearing race.

10. The roller according to claim 1, wherein the recess is disposed in a region of zero crossover of bending stress occurring in the outer ring during operation of the roller.

11. An outer ring for a roller that also comprises an inner race and a plurality of roller bodies disposed radially outwardly of the inner race for rolling on an outer peripheral surface of the inner race, the outer ring comprising an annular ring provided with at least one annular recess in which is disposed an annular reinforcement body that subjects a region of the annular ring located radially inwardly of the reinforcement body to mechanical stresses, a side of the reinforcement body facing towards said region being materially joined to the annular ring.

12. The outer ring according to claim 11, wherein said annular ring possesses oppositely located and axially facing end faces, said recess opening towards one of the end faces of the annular ring.

13. The outer ring according to claim 11, wherein said annular ring possesses a radially outwardly facing outer peripheral surface, said recess opening towards the outer peripheral surface of the annular ring.

14. The outer ring according to claim 11, wherein the recess has a conical cross-section.

15. The outer ring according to claim 11, wherein the recess is disposed in a region of zero crossover of bending stress occurring in the outer ring during operation of the roller.

16. The outer ring according to claim 11, wherein the outer ring is adapted to be used as an outer race of the roller with a bearing race concentrically surrounding the outer race.

17. The outer ring according to claim 11, wherein the outer ring is adapted to be used as a bearing race of the roller with an outer race concentrically surrounded by the bearing race.

* * * * *